(12) United States Patent
Otten

(10) Patent No.: US 7,220,084 B2
(45) Date of Patent: May 22, 2007

(54) POWER DRILL ATTACHMENT AND METHOD FOR USING THE ATTACHMENT

(75) Inventor: Juergen Otten, Tiste (DE)

(73) Assignee: Airbus Deutschland GmbH, Hamburg (DE)

( * ) Notice: Subject to any disclaimer, the term of this patent is extended or adjusted under 35 U.S.C. 154(b) by 510 days.

(21) Appl. No.: 10/771,281

(22) Filed: Feb. 2, 2004

(65) Prior Publication Data
US 2004/0175244 A1    Sep. 9, 2004

(30) Foreign Application Priority Data
Jan. 31, 2003    (DE) .................... 103 03 804

(51) Int. Cl.
B23B 35/00    (2006.01)
(52) U.S. Cl. .............. 408/1 R; 408/110; 408/136; 408/712
(58) Field of Classification Search ............. 408/72 B, 408/95, 97, 92, 110–113, 115 R, 136, 712, 408/1 R
See application file for complete search history.

(56) References Cited

U.S. PATENT DOCUMENTS

| | | | |
|---|---|---|---|
| 994,430 A | 8/1911 | Tunks | |
| 1,831,813 A | 11/1931 | Levedahl | |
| 2,335,614 A * | 11/1943 | Spievak | 408/84 |
| 2,339,324 A | 1/1944 | Fischer | |
| 2,418,956 A | 4/1947 | Silver | |
| 2,461,716 A * | 2/1949 | Blatt | 408/112 |
| 2,539,223 A * | 1/1951 | Bellek | 408/112 |
| 2,541,306 A * | 2/1951 | Taylor | 408/111 |
| 2,625,062 A * | 1/1953 | Heil | 408/79 |
| 2,637,225 A * | 5/1953 | Benbow | 408/99 |
| 3,045,727 A | 7/1962 | Clarks | |
| 3,060,769 A * | 10/1962 | Heider | 408/95 |
| 3,698,827 A * | 10/1972 | Salfer | 408/92 |
| 4,209,069 A | 6/1980 | Smith | |
| 4,507,026 A * | 3/1985 | Lund | 408/72 B |
| 4,657,446 A | 4/1987 | Flaten | |
| 4,764,060 A * | 8/1988 | Khurana | 408/14 |
| 4,897,000 A | 1/1990 | Suzuki | |
| 5,161,923 A | 11/1992 | Reccius | |
| 5,356,245 A | 10/1994 | Hosoi et al. | |
| 5,404,641 A | 4/1995 | Bratten et al. | |
| 5,584,618 A | 12/1996 | Blankenship et al. | |

(Continued)

FOREIGN PATENT DOCUMENTS

DE    1782820 B  *  3/1977

(Continued)

*Primary Examiner*—Daniel W. Howell
(74) *Attorney, Agent, or Firm*—W. F. Fasse; W. G. Fasse

(57) ABSTRACT

In order to facilitate and make more ergonomic the drilling of a multitude of holes in workpieces, particularly in the assembly of large scale components, such as an aircraft body, the power drill is docked to a support by an attachment which engages and locks onto a guide bushing or bore in the support. The attachment assures that the drill bit is precisely axially aligned with a hole to be drilled. The feed advance is performed by a leveraged action controlled by the operator. The leverage can be provided, for example by a Bowden pull cable. The attachment reduces the exertion to be made by the operator, thereby avoiding ergonomically unsatisfactory work positions.

17 Claims, 3 Drawing Sheets

U.S. PATENT DOCUMENTS

| | | |
|---|---|---|
| 5,791,842 A | 8/1998 | Sugata |
| 5,961,258 A | 10/1999 | Ende et al. |
| 5,993,122 A | 11/1999 | Baker |
| 6,264,590 B1 | 7/2001 | Ferrari |
| 6,413,022 B1 | 7/2002 | Sarh |
| 6,503,029 B1 | 1/2003 | Ende et al. |
| 2004/0141821 A1 | 7/2004 | Otten |

FOREIGN PATENT DOCUMENTS

| | | | |
|---|---|---|---|
| DE | 1903089 B | * | 9/1977 |
| DE | 3222037 A1 | * | 4/1984 |
| DE | 3927971 A1 | * | 2/1991 |
| DE | 4002445 C1 | * | 6/1991 |
| DE | 19945097 | | 3/2001 |
| DE | 20211393 U1 | * | 1/2003 |

* cited by examiner

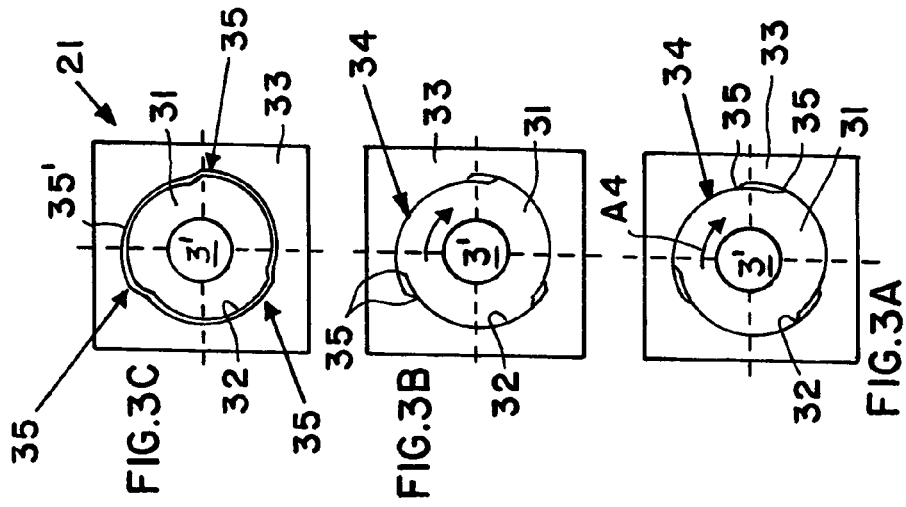
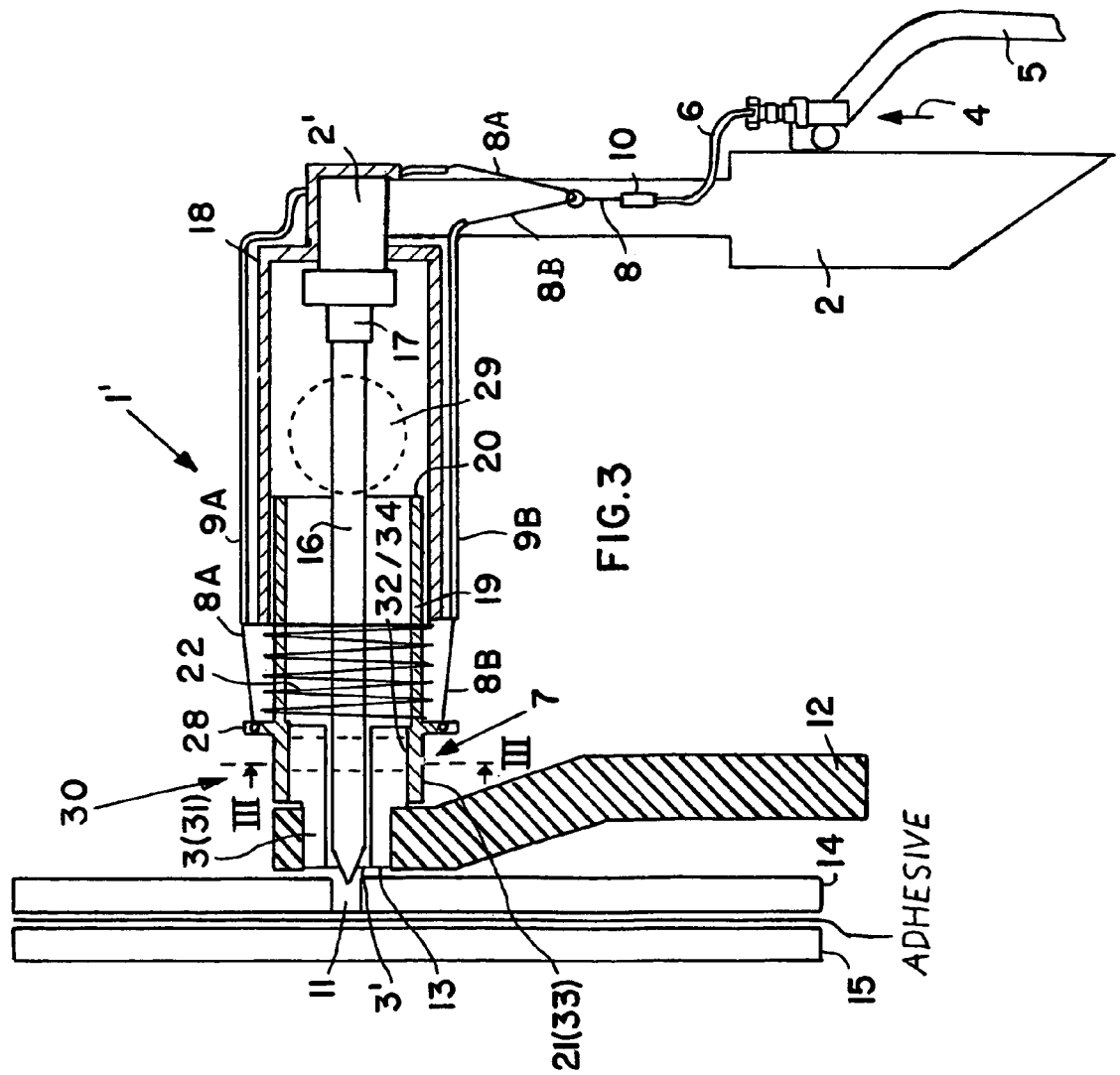

POWER DRILL ATTACHMENT AND METHOD FOR USING THE ATTACHMENT

CROSS-REFERENCE TO RELATED APPLICATION

This application is related to U.S. application Ser. No. 10/755,049 filed Jan. 8, 2004, by the same inventor as the present application.

PRIORITY CLAIM

This application is based on and claims the foreign priority under 35 USC §119 of German Application 103 03 804.3 filed on Jan. 31, 2003, the entire disclosure of which is incorporated herein by reference.

FIELD OF THE INVENTION

The invention relates to an attachment that is secured to a power drill for positioning the power drill precisely relative to a hole to be drilled and for facilitating the feed advance of a drill bit.

BACKGROUND INFORMATION

In the production of certain large scale components each including a plurality of structural elements, a multitude of rivet holes are required for connecting the structural elements by rivets particularly in the production of aircraft components. Manually operated power tools such as power drills are hard to hold in a precise position while simultaneously assuring a proper feed advance during the drilling, for example in the assembly of an aircraft body or other large scale components. The difficulties in precisely holding a power drill are aggravated when the different drilling positions are hard to access and/or when the tools or power tools are rather heavy, whereby operating such tools without any aids becomes rather fatiguing. Thus, this type of work requires substantial strength on the part of the worker and frequently limits of a worker's capacities are reached, which is ergonomically not desirable. Another disadvantage in connection with freely handheld power drills is seen in that it is very difficult to constantly hold the tool or drill bit in a precisely axially aligned position relative to the hole to be drilled perpendicularly to the surface of the workpiece such as a panel. However, a precisely drilled hole perpendicularly to the panel surface is required for meeting quality standards. Moreover, the feed advance force that must be applied by the worker must maintain the precise tool position during each drilling operation. These requirements are problematic, particularly where the drilling location is hard to access.

OBJECTS OF THE INVENTION

In view of the foregoing it is the aim of the invention to achieve the following objects singly or in combination:

to provide an attachment for a power tool, particularly a power drill, which will reduce an assembly worker's burden by reducing the force required for performing such drilling work;

to construct the attachment in such a way that a precise guiding of the power drill and thus of its drill bit relative to a workpiece is automatically assured to provide drilled holes that satisfy quality requirements;

to leverage the force applied by the assembly worker to assure a steady and uniform feed advance force in any working position; and to achieve the foregoing in an economic and ergonomic manner.

SUMMARY OF THE INVENTION

The above objects have been achieved according to the invention by an attachment for a power drill, said attachment comprising an attachment bushing secured to said power drill, a latching unit for securing said attachment to a support, a feed advance mechanism for leveraging the force for driving the power drill in a feed advance direction, wherein the latching unit comprises a latch bushing for cooperating with the attachment bushing, and wherein said feed advance mechanism comprises an operating member and a feed advance controller operatively connected to said operating member for applying a leveraged feed advance motion to said power drill.

According to the invention there is further provided an apparatus for drilling holes into a workpiece, said apparatus comprising a power drill, an attachment for said power drill, said attachment comprising an attachment bushing secured to the power drill, a support, a latching unit for securing said attachment to said support, a feed advance mechanism for driving said power drill in a feed advance direction, said latching unit comprising a latch bushing for cooperation with said attachment bushing and with said support, said feed advance mechanism comprising an operating member and a feed advance controller operatively connected to said operating member for performing a leveraged feed advance motion of said power drill, said support comprising a drill bit guide channel, and means for latching said attachment to said drill bit guide channel.

According to the invention there is further provided a method for operating an apparatus for drilling holes into a workpiece, said method comprising the following steps:

a) establishing a rigid connection between a drill bit guide channel and a latch bushing of a power drill, b) starting said power drill, and c) applying a leveraged feed advance force to said power drill through a feed advance controller.

By releasably securing the attachment and thus the power drill to a support, the force to be exerted by the assembly worker, is substantially reduced or even minimized. Thus, the power drill can be more easily used in inconvenient working positions. Further, the attachment carries a leveraged feed advance mechanism which requires little force on the part of the worker for applying a steady, uniform, sufficient and precise feed advance motion to the power drill, and thus to the drill bit. The combination of these features greatly reduces the exertions that an assembly worker had to make heretofore, particularly with the shoulder and arm area. Further, any danger of injury by the power tool is minimized by the present attachment. Thus, the present attachment makes the assembly worker's job more easy and hence more ergonomical. Economically, the benefits are greatly multiplied if one takes into consideration that in the assembly process of a large volume structural component such as an aircraft fuselage, a multitude of precisely drilled holes have to be produced.

BRIEF DESCRIPTION OF THE DRAWINGS

In order that the invention may be clearly understood, it will now be described in connection with example embodiments thereof, with reference to the accompanying drawings, wherein:

FIG. 3 is a view similar to that of FIG. 2, but illustrating a second embodiment of a latching mechanism to secure the attachment with the drill to a support;

FIGS. 3A, 3B and 3C illustrate a sectional view through a circular chucking mechanism for securing the attachment to a support.

DETAILED DESCRIPTION OF A PREFERRED EXAMPLE EMBODIMENT AND OF THE BEST MODE OF THE INVENTION

Figure 1:
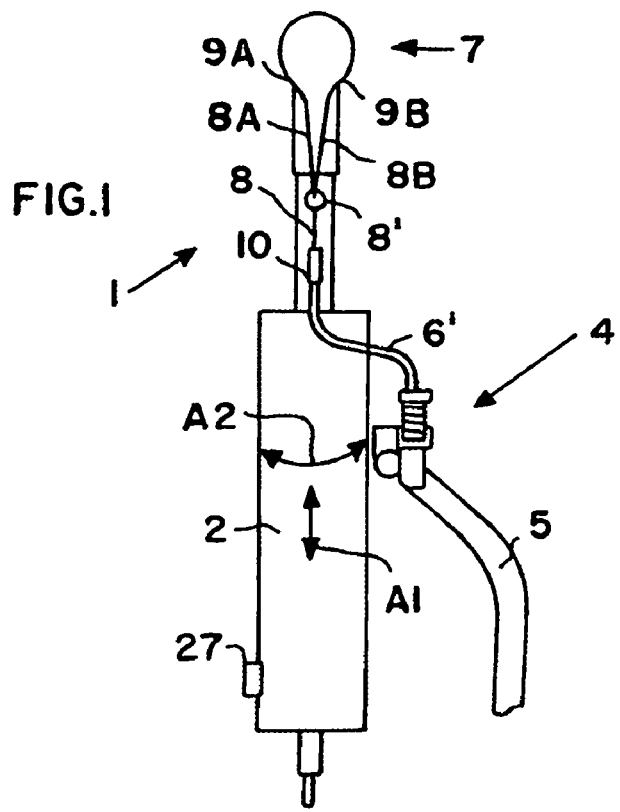
FIG. 1 shows a schematic illustration of an attachment according to the invention in combination with a power drill.

FIG. 1 shows schematically an attachment 1 for a power drill 2. The attachment 1 comprises a latching unit 7 and a leveraged feed advance mechanism 4. The latching unit 7 secures and guides the power drill 2 relative to a workpiece 14, 15 shown in FIG. 2. The feed advance mechanism 4 serves for advancing the drill bit 16 toward the workpiece 14, 15 to drill a hole through a predrilled hole 11 which acts as a template hole. The feed advance mechanism 4 is a manually operable feed advance lever 5 which is positioned in a location preferably next to the power drill 2 for easy access by the operator. The power drill 2 is preferably an angular power drill for easy access to tight working locations in which a drill bit 16 needs to extend perpendicularly to the length axis of the drill. Holding the drill in one hand and performing the leveraged feed advance with the other hand greatly facilitates the hole drilling. The feed advance and return of the drill 2 is indicated by the double arrow A1. The feed advance mechanism 4 with its lever 5 can be positioned on the right-hand side of the power drill 2 as shown in FIG. 1, or it can be positioned on the left-hand side as indicated by the double arrow A2. The return of the drill into a starting position is accomplished by a spring 22 when the lever 5 is released, as described in more detail. Thus, the feed advance mechanism can be operated right-handed or left-handed.

Figure 2:
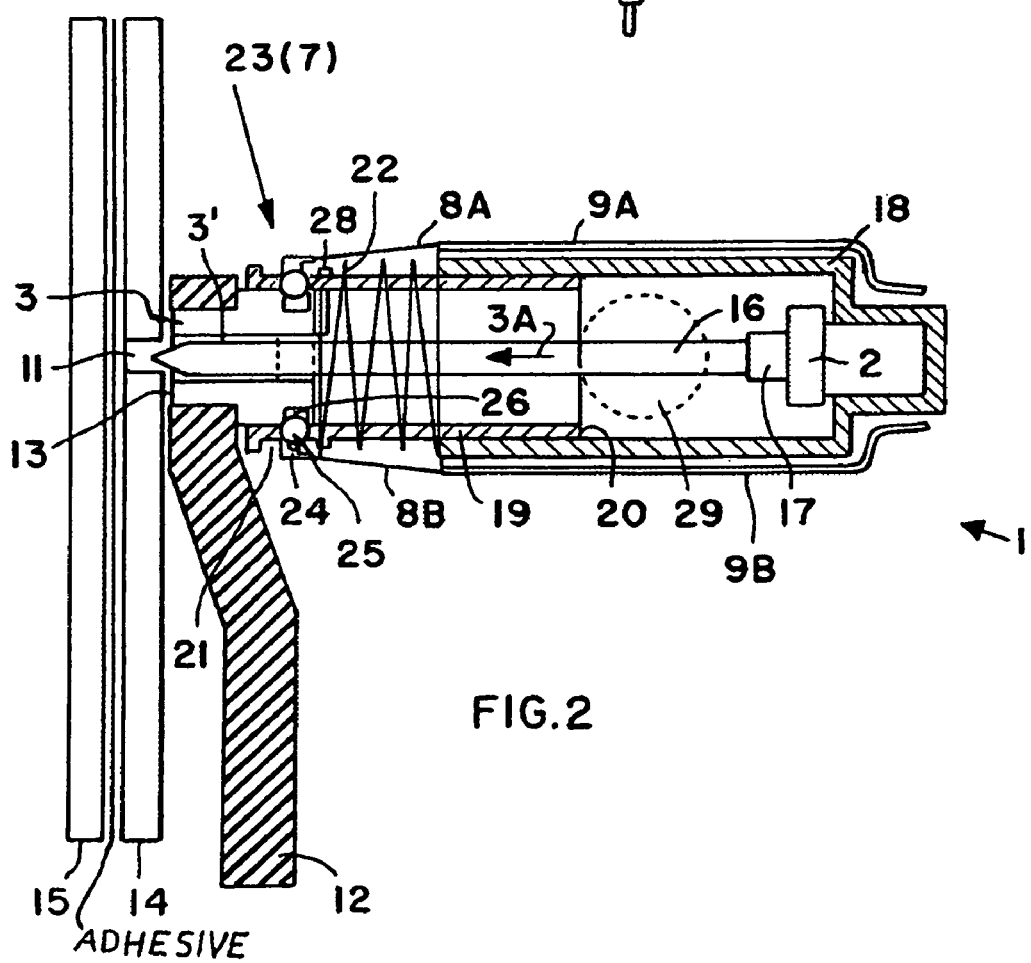
FIG. 2 is a section view in a plane passing axially through a drill bit and showing the details of the present power drill attachment with a first embodiment of a latching mechanism to secure the attachment and thus the drill to a support.
Figure 4:
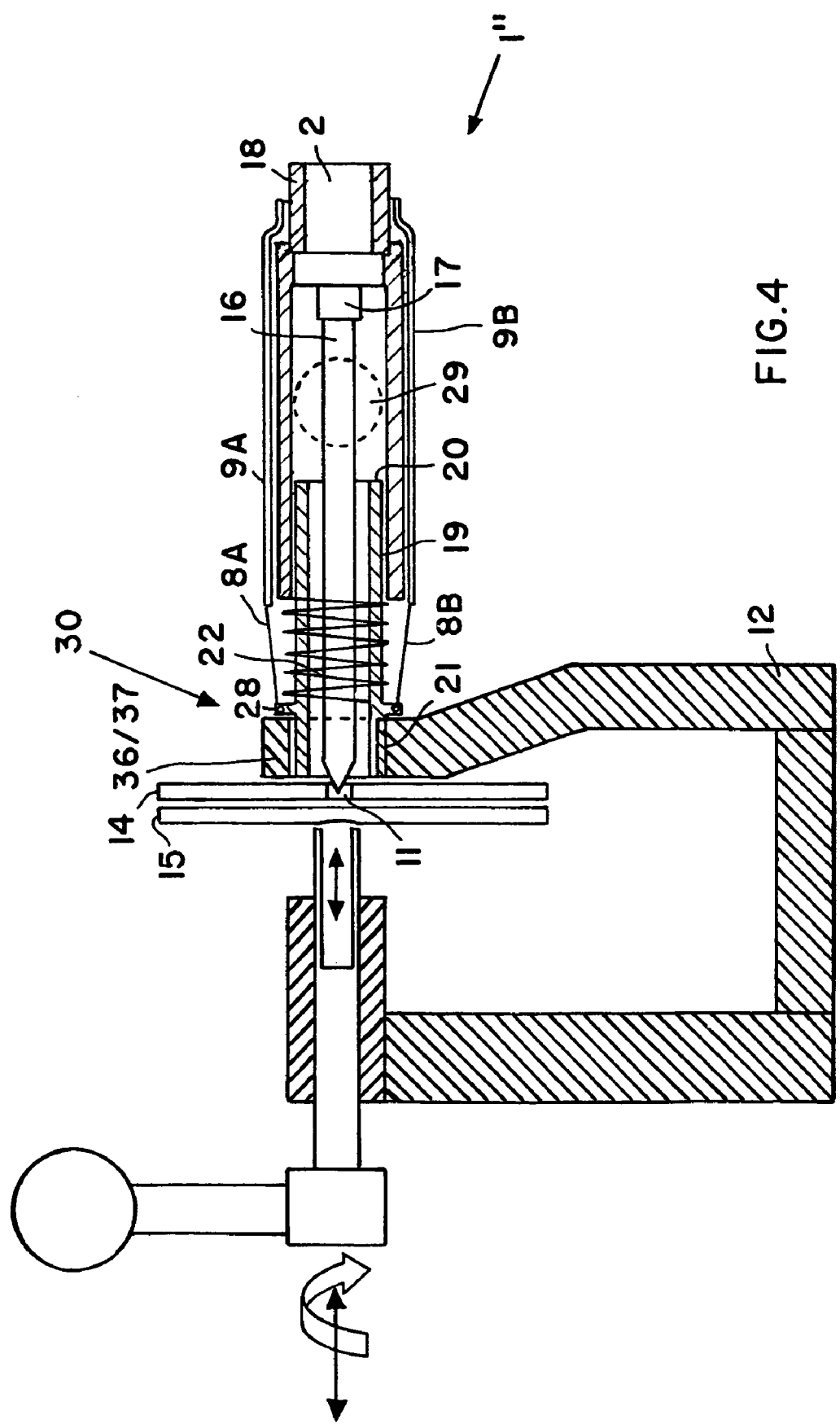
FIG. 4 is a view similar to that of FIG. 3, however illustrating a further embodiment of a latching mechanism.

In a modified embodiment of the invention an on-off switch 27 is so positioned that the switch can be operated with the feed advance lever 5, whereby the power drill is switched on when the feed advance lever 5 is operated into the feed advance position. It is also possible to completely separate the feed advance lever from the power drill 2 to thereby provide a feed advance control that is independent of the instantaneous position of the power drill 2. In all instances the feed advance lever 5 operates a force transmission device 6 such as a Bowden cable pull which is preferably equipped for the present purposes with two cable ends 8A and 8B shown in FIG. 2. The two cable ends 8A and 8B are operatively connected to the latching unit 7 which interlocks the attachment 1 and thus the power drill 2 with a support. The support may be, for example a leg 12 of a clamping mechanism described in detail in my above cross-referenced, U.S. patent application Ser. No. 10/755,049 filed Jan. 8, 2004. In the embodiments of FIGS. 2 and 3, the workpiece clamp leg 12 has a bore 13 axially aligned with the template hole 11. One end of a drill bit guide bushing 3 is inserted into the bore 13. In the embodiment of FIG. 4 the function of the guide bushing has been taken over by a front end 21 of a latch bushing 19 to be described below. In all three embodiments the latching of the attachment 1 to the support 12 assures a proper positioning of the power drill 2 and its precise alignment axially relative to the hole 11 in a panel workpiece 14 that may be adhesively bonded to another panel workpiece 15. In the shown illustration the predrilled holes 11 in the workpiece 14 permit using the workpiece 14 as a template. Once the attachment 1 is properly docked to the support 12 either with the help of the drill bit guide bushing 3 as shown in FIGS. 2 and 3 or with the help of the front end 21 of the latch bushing 19 as shown in FIG. 4, the power drill 2 and its drill bit 16 are in a proper position to begin the drilling with a drill feed advance force that is precisely directed in the drilling feed advance direction axially to the hole 11 and perpendicularly to the surface of the workpiece 14.

According to the invention the feed advance is accomplished by the force transmitting device 6 such as a Bowden cable pull provided with an outer sheath 6' connected to a fixed point 10 of the attachment 1. A pull cable 8 is guided in the sheath 6'. The cable 8 has two cable ends 8A and 8B which are respectively guided in detouring and guiding sleeves 9A and 9B running along an attachment bushing or housing 18 shown in FIG. 2. The two cable ends 8A and 8B run through a ring 8' which in turn is connected to the pull cable 8 as seen in FIG. 1.

FIG. 2 shows a sectional view of a first embodiment of the attachment 1. The above mentioned drill bit guide bushing 3 is permanently or releasably secured in the bore 13 of the clamping leg 12 forming a support. The bushing 3 forms a guide channel 3' for the drill bit 16. The guide bushing 3 is preferably inserted into the bore 13 of the clamping leg 12 with a location fit or a form fit to thereby assure a precise positioning and axial alignment of the drill bit 16 with the predrilled hole 11.

This type of positioning is one of several possibilities for using the attachment 1 according to the invention. Instead of the predrilled workpiece 14 a drilling template could be used or the clamping device with the clamping leg 12 could be replaced by a clamping template or by drill clamping tongues.

The guide bushing 3 has a flange 3" projecting out of the bore 13 of the clamping leg 12 for docking with the latch bushing 19 that is telescoping relative to the attachment bushing 18 which is secured to the front end of the drill 2. For interlocking the latch bushing 19 with the guide bushing 3, the flange 3" of the guide bushing 3 is provided with a circumferential groove 26 for engagement with a locking ball ring 25 mounted in the front end 21 of the latch bushing 19. The attachment bushing 18 substantially encloses the drill bit 16 which is held by a conventional chuck 17 of the power drill 2.

As shown in FIG. 2, a rear end portion 20 of the latch bushing 19 is axially slidable back and forth in the attachment bushing 18. A spring 22 bears against the forward end of the bushing 18 and against a stop or flange 28 on the front end 21 of the latch bushing 19 with the tendency to push the two bushings 18 and 19 apart for returning the attachment 1 into a starting position when the drilling of a hole is completed and the feed advance layer 5 is released. The attachment 1 and the bushing 3 are interlocked by pushing the front end of the bushing 19 onto the flange 3" of the bushing 3. Then operating the feed advance lever 5 pulls a locking ring 24 against the locking ball ring 25 which thereby engages the groove 26. For this purpose the cable ends 8A and 8B are secured to the locking ring 24, preferably at diametrically opposite points to assure an equal and symmetric pull distribution.

By continuing the operation of the feed advance lever 5, the cable ends 8A and 8B will apply the feed advance force against the locking balls of the locking ring 25, thereby imposing a feed advance force in the direction of the arrow A3. Thus, the operation of the cable pull performs two functions. Namely, the described feed advance and the simultaneous interlocking of the front end 21 of the latch bushing 19 with the guide bushing 3 by pushing the balls of the ball ring 25 into the groove 26 through holes in the front end 21 of the latch bushing 19, whereby a formlocking interconnection between the bushing 3 and the power drill 2 is assured. Thus, the power drill 2 with its drill bit 16 is precisely oriented relative to the workpiece 14, 15 so that the drill bit 16 extends perpendicularly relative to the plane of the workpiece 14. When the cable pull force is released, the spring 22 will push the bushings 18 and 19 apart by bearing against a stop or against the flange 28 of the latch bushing 19 and against the front end of the bushing 18, thereby permitting the spring biased locking balls 25 to get out of the groove 26, whereby the drill 2 with its attachment 1 can be readily undocked from the guide bushing 3.

FIGS. 3 and 4 show further preferred embodiments of a drill attachment 1' and 1" according to the invention, whereby so-called circular wedge conventional clamping chucks are used for releasably securing the attachment to the support 12. Such chucks are generally known from German Patent Publication DE 199 45 097 A1. However, these chucks have been modified for the purposes of the invention with a central bore that forms the drill bit guide channel 3'. In the first embodiment shown in FIG. 2, the interlocking was accomplished by operating the Bowden cable pull 6. In the second and third embodiments shown in FIGS. 3 and 4, the cable pull 6 need not be operated for the interlocking. In these embodiments the pull cable 6 and the lever 5 are operated only for producing the feed advance force for the drilling operation.

In FIG. 3 the drill bit 16 of the power drill 2 is also enclosed by the drill attachment 1' including the attachment bushing 18 mounted to the angling chuck 2' of the power drill 2. The latch bushing 19 and the attachment bushing 18 are also constructed for telescoping one within the other. Thus, the basic construction of the embodiment of FIG. 3 is the same as in FIG. 2. However, in the embodiment of FIG. 3 the interlocking or latching of the power drill 2, more specifically of the latch bushing 19 with the guide bushing 3 is accomplished by using an interlocking chuck, the function of which will now be described with reference to FIGS. 3A, 3B and 3C. The interlocking chuck has been modified for the purposes of the invention by providing the central chuck shaft 31, which forms part of the guide bushing 3, with an axially extending bore to form the guide channel 3' through the guide bushing 3.

FIGS. 3A, 3B and 3C are essentially sectional views along section line III—III in FIG. 3 showing different angular positions of the shaft 31 relative to a hub 33 or vice versa. The hub 33 is part of the front end 21 of the latch bushing 19. In each of FIGS. 3A, 3B and 3C the guide bushing 3 including its flange portion forms the shaft 31. The shaft 31 has an outer surface 32 that engages the inner surface 34 of the hub 33 formed by the outer end 21 of the latch bushing 19. The outer surface of the shaft 31 is provided with wedging profiles 35 which correspond to respective wedging profiles in the inwardly facing inner surface 34 of the hub 33. The wedging profiles 35 in the outer surface 32 of the shaft 31 and in the inner surface 34 of the hub 33 conform to one another. These wedging profiles 35 are formed by at least two segments of a logarithmic spiral. These spiral segments are referred to as circular wedges, whereby the number of such circular wedges 35 and their pitch is the same for the shaft 31 and the hub 33.

FIG. 3C shows a joining gap 35' between the shaft 31 and the hub 33 formed by the front end 21 of the latch bushing 19. The joining gap 35' provides sufficient play for pushing the hub 33 onto the shaft 31. Relative rotation between the hub 33 and the shaft 31 is needed to interlock the hub 33 with the shaft 31. For example, the shaft 31 is rotated clockwise as indicated by the arrow A4 and as seen by a viewer looking at FIGS. 3A and 3B. Clockwise rotation of the shaft 31 relative to the hub 33 eliminates the joining gap 35' no longer seen in FIGS. 3B and 3A because the surfaces 32 and 34 of the circular wedges 35 have contacted each other. In practice this interlocking is achieved by rotating the power drill 2 with its attachment 1' relative to the guide bushing 3 and thus relative to the shaft 31, through an angular range of about 10 to 30°. For unlocking, the drill 2 and the hub 33 are rotated counterclockwise so that the hub 33 and the shaft 31 again assume the position shown in FIG. 3C so that the drill 2 with its attachment can be withdrawn from the shaft 31. Once this just described docking operation is completed, the feed advance control lever 5 and the Bowden pull cable 6 are operated to produce the required feed advance for the drilling operation. For this purpose the cable ends 8A and 8B are secured to a stop or flange 28 of the latch bushing 19. As the cable ends 8A and 8B pull in the direction to the right in FIG. 3, the latch bushing 19 moves deeper into the attachment bushing 18, whereby the power drill 2 is moved in the feed advance direction, to the left in FIG. 3, as indicated by the arrow A3 in FIG. 2.

FIG. 4 shows a third embodiment of the drill attachment 1". The interlocking between the front end 21 of the latch bushing 19 and the support 12 is accomplished by a wedging chuck 36, 37 as described above with reference to FIGS. 3A, 3B and 3C. Such a circular wedge chuck assures a connection between the drill 2 and the support 12 without any play and in precise axial alignment relative to the workpiece or rather the hole 11 in the workpiece. The latch bushing 19 is directly inserted into a respective bore 13 in the support 12. The outer surface 36 of the front end 21 of the bushing 19 and the inner surface 37 of the bore 13 are provided with the wedging profiles 35 which cooperate as above described. The embodiment of FIG. 4 is particularly suitable for use of the power drill 2 in places with very little space for the drilling operation. The chucking action of the wedging surfaces 36, 37 is the same as described above with reference to FIGS. 3A, 3B and 3C. The power drill 2 is rotated into the locked position in one direction and the feed advance by the feed advance mechanism 4 through the Bowden cable pull 6 can proceed as described.

Once the latching of the attachment 1 or 1' or 1" is completed as described above, the power drill 2 is switched on by a switch 27. The feed advance for the drilling operation is applied by the operator with a leverage or mechanical advantage through the feed advance lever 5. It is not necessary for the assembly worker to precisely hold and press the drill against the workpieces 14, 15. Rather, the leverage provided by the feed advance mechanism 4 and the automatic alignment of the drill bit enable the worker to exert but little force to provide the required feed advance force for the drill bit 16. The alignment of the drill bit relative to the hole 11 in the workpiece 14 is automatically assured by the latching and locking of the attachment 1, 1', 1" relative to the guide bushing 3 or relative to the bore 13 in the support 12.

By using two cable ends 8A and 8B respectively guided in detouring and guiding sleeves 9A and 9B arranged opposite each other an equal and symmetric distribution of the feed advance force is accomplished and the respective force components are applied to the latch bushing 19 either through the locking ring 24 as shown in FIG. 2 or to the flange 28 as shown in FIGS. 3 and 4. The equal distribution of the feed advance force to both sides of the attachment assures that the axial alignment of the drilling bit 16 with the hole 11 in the workpiece 14 is not disturbed and the precise guiding of the attachment with the drill is assured throughout the drilling operation as soon as the latch bushing 19 has been pushed with its front end 21 onto the guide bushing 3 or into the bore 13 of the support 12. The flange 28 serves in all embodiments as a stop for limiting the feed advance movement. The stop or flange 28 can be a stationary element whereby the total feed advance distance remains constant. However, it is also possible to replace the flange 28 by a threaded ring that is adjustable along a respective threading on the outer surface of the latching bushing 19, whereby the repositioning of the threaded ring provides an adjustable feed advance distance. However, where a multitude of drilled holes is to be produced in the workpieces 14, 15 where a fixed drilling depth is required, a fixed stop in the form of the fixed flange 28 is preferable. In both instances the drilling is completed when the helical spring 22 between the front end of the attachment bushing 18 and the stop flange 28 can no longer be further compressed. The power to the drill 2 is switched off by the switch 27 and the feed advance lever 5 is released. At this point the spring 22 becomes effective and returns the attachment 1, 1', 1" together with the drill 2 back into a starting position.

In all embodiments a suction connector or coupling shown symbolically at 29 is provided for connection to a suction hose for removing any drill chips out of the attachment. Thus, a clean and quality satisfying operation is assured. Further, in modified embodiments the feed advance power can be controlled in closed loop fashion by a hydraulic cylinder which even increases the uniformity of the feed advance. Further, the Bowden pull cable 8 could be driven by a pneumatic or hydraulic device, whereby limiting of the feed advance force could be precisely controlled.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An attachment for a power drill, said attachment comprising an attachment bushing (18) secured to said power drill, a latching unit (7) for securing said attachment to a support (12), a feed advance mechanism (4) for driving said power drill in a feed advance direction, said latching unit (7) comprising a latch bushing (19) for cooperation with said attachment bushing (18), said feed advance mechanism (4) comprising an operating member (5) and a feed advance controller (6, 8) operatively connected to said operating member (5) and to said latch bushing (19) for applying a feed advance motion to said power drill.

2. The attachment of claim 1, wherein said operating member (5) comprises a feed advance lever which is operatively mounted relative to said power drill for ergonomic access by an operator to the feed advance lever.

3. The attachment of claim 1, wherein said feed advance controller (6) comprises a Bowden cable pull having two cable ends (8A, 8B) secured to said latch bushing (19) at two respective connection points.

4. The attachment of claim 3, further comprising two guide sleeves (9A, 9B) one each for said two cable ends (8A, 8B), said guide sleeves being secured to said attachment bushing (18) in positions for guiding said cable ends to said respective connection points on said latch bushing.

5. The attachment of claim 1, wherein said latch bushing (19) is adapted for cooperation with a drill bit guide bushing (3) operatively secured to said support (12) in a position for drilling a hole (11) in a workpiece, and wherein said latching unit (7) comprises means for releasably latching said latch bushing (19) to said drill bit guide bushing (3).

6. The attachment of claim 5, wherein said means for releasably latching comprise a wedging chuck operatively interposed between said latch bushing (19) and said drill bit guide bushing (3) for latching said power drill to said drill bit guide bushing (3) by a friction fit.

7. The attachment of claim 5, wherein said latch bushing (19) comprises a front end (21) and a rear end (20), wherein said means for releasably latching comprise a locking ring (24) movably mounted to said front end (21) of said latch bushing (19) and a ball ring (25) mounted in said front end (21) for simultaneous cooperation with said locking ring (24) and with said guide bushing (3) in response to an operation of said locking ring (24), and wherein said feed advance controller (6, 8) is connected to said locking ring (24) for moving said locking ring (24) into a locking position by moving said operating member (5), whereby said locking ring (24) engages and drives said ball ring (25) into engagement with said guide bushing (3) for releasably latching said latch bushing (19) to said drill bit guide bushing (3) with a form-locking fit.

8. The attachment of claim 1, wherein said latch bushing (19) comprises a front end (21) adapted for cooperation with a guide channel or bore (13) in a clamping member (12) forming said support for holding a workpiece (14), said front end (21) fitting lockingly into said guide channel (13) for latching said attachment to said clamping member (12).

9. The attachment of claim 1, wherein said latch bushing (19) comprises a stop member (28) for limiting said feed advance motion of said attachment bushing (18) relative to said latch bushing (19).

10. The attachment of claim 9, wherein said stop member (28) is a flange or ring rotatable relative to said latch bushing (19) for adjusting a stop position of said stop member (28) to thereby adjust a drilling depth.

11. The attachment of claim 1, further comprising a reset spring (22) operatively interposed between said latch bushing (19) and said attachment bushing (18) for returning said power drill into a starting position when said feed advance motion is stopped.

12. An apparatus for drilling holes into a workpiece, said apparatus comprising a power drill, an attachment for said power drill, said attachment comprising an attachment bushing (18) secured to said power drill, a support (12) including a workpiece clampinQ device, a latching unit (7) for securing said attachment to said support, a feed advance mechanism (7) for driving said power drill in a feed advance direction, said latching unit (7) comprising a latch bushing (19) for cooperation with said attachment bushing (18), said feed advance mechanism (7) comprising an operating member (5) and a feed advance controller (6, 8) operatively connected to said operating member (5) for performing a feed advance motion of said power drill, said support comprising a drill bit guide channel and means for latching said attachment to said drill bit guide channel.

13. A method for operating an apparatus for drilling holes into a workpiece, said method comprising the following steps:
   a) establishing a rigid connection between a drill bit guide channel and a latch bushing (19) of a power drill,
   b) starting said power drill, and
   c) operating a Bowden cable pull (8, 8A, 8B) for applying a leveraged feed advance force to said power drill through a feed advance controller.

14. The apparatus of claim 12, wherein said workpiece clamping device of said support (12) comprises a clamping template for holding a workpiece, said clamping template comprising predrilled holes adapted for axial alignment with said drill bit guide channel.

15. The apparatus of claim 12, wherein said drill bit guide channel comprises a drill bit guide bushing (3) mounted to said support (12).

16. The apparatus of claim 12, wherein said latch bushing (19) comprises a front end (21) fitting into said drill bit guide channel (37) and wherein said means for latching are operatively interposed between an outer wall surface (36) of said front end and an inner surface (37) of said guide channel for releasably latching said attachment to said guide channel in said support (12).

17. The apparatus of claim 12, wherein said attachment bushing (18) and said latch bushing (19) are arranged for telescoping relative to each other in response to an operation of said operating member (5).

* * * * *